Dec. 9, 1947.  S. D. RUSSELL  2,432,212
BALER AND DRIVE
Original Filed April 19, 1941  2 Sheets-Sheet 2
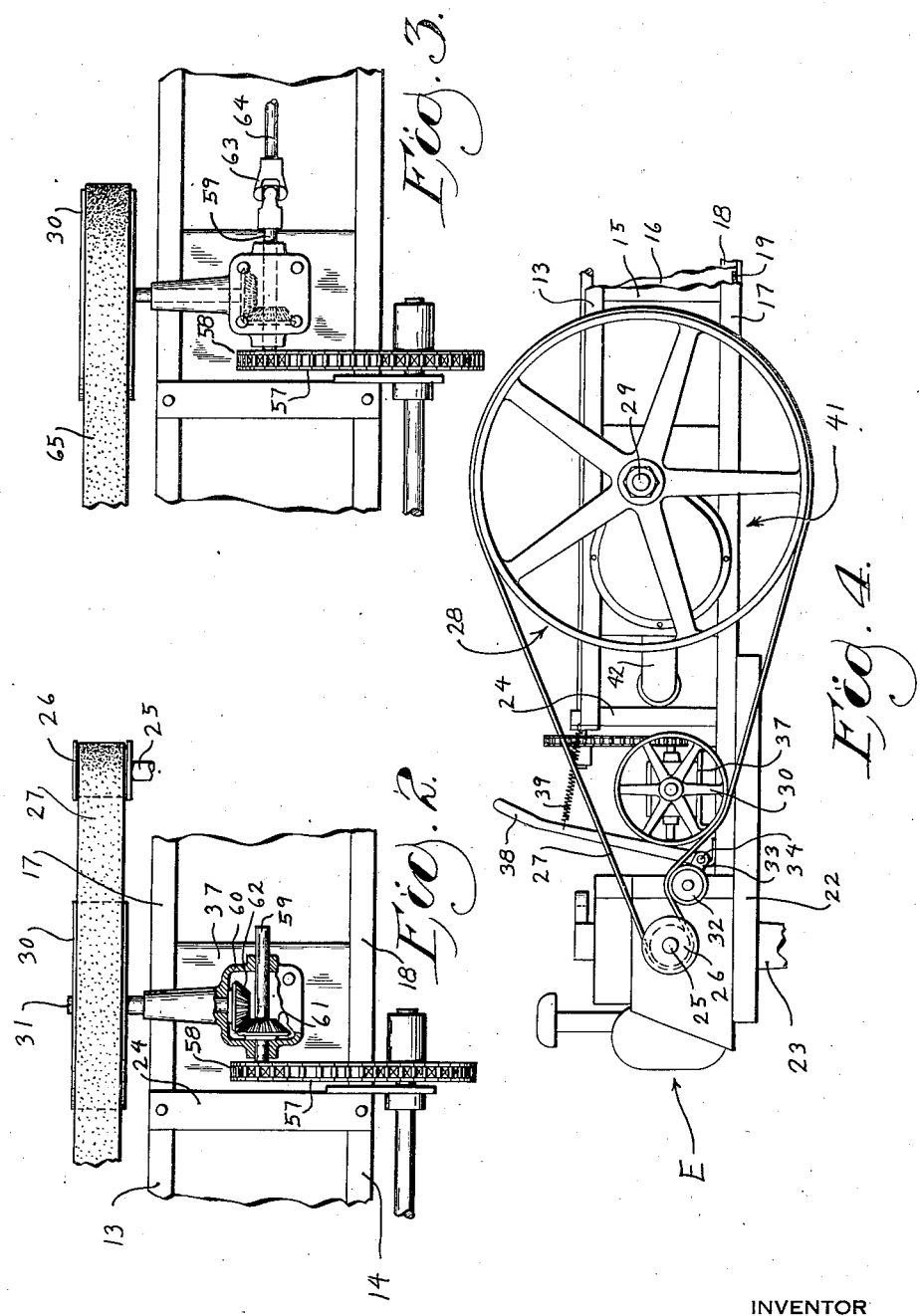
INVENTOR
Stanley D Russell
BY
Emerson B Donnell
ATTORNEY Patented Dec. 9, 1947

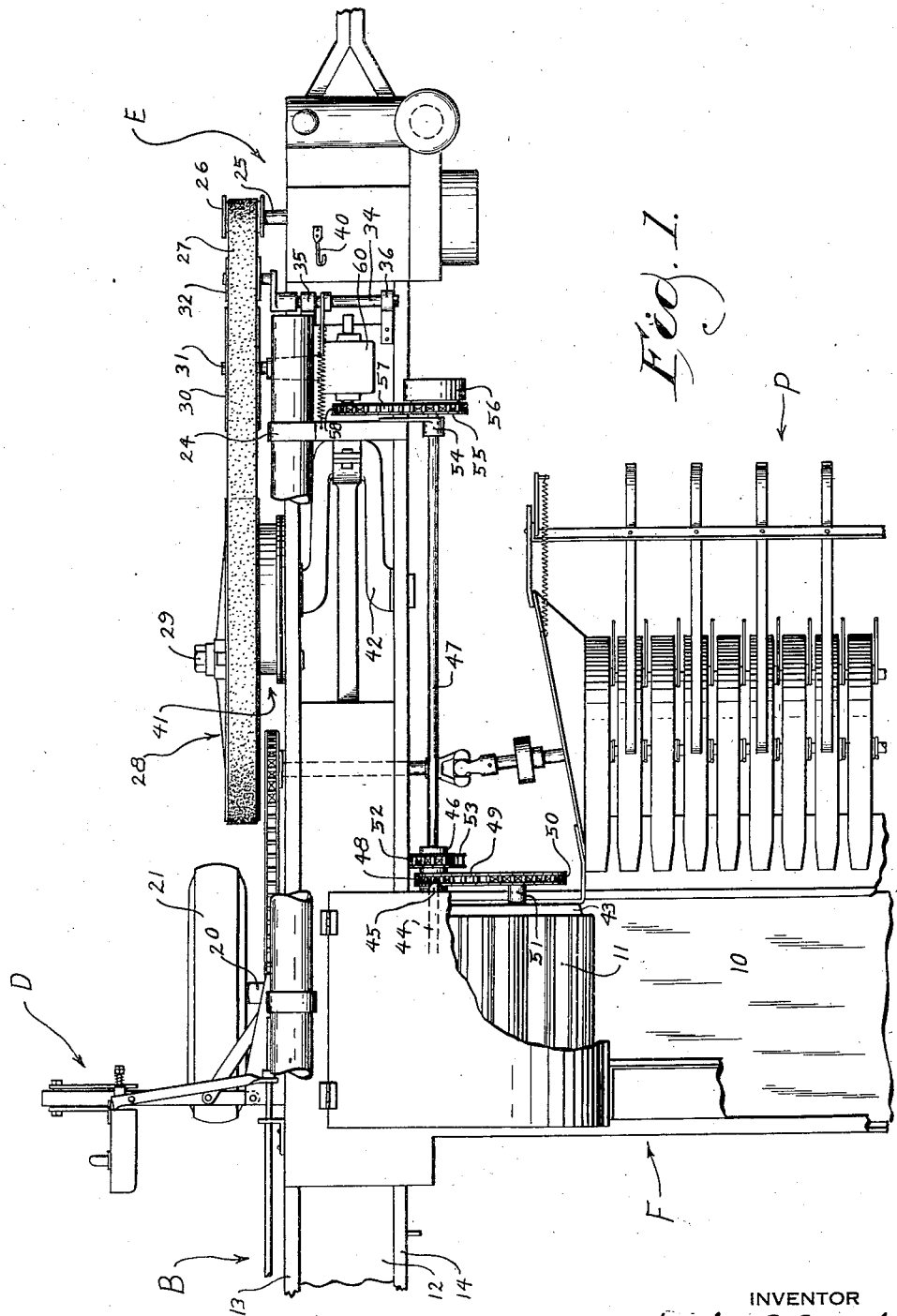

2,432,212

UNITED STATES PATENT OFFICE 2,432,212

BALER AND DRIVE

Stanley D. Russell, Racine, Wis., assignor to J. I. Case Company, Racine, Wis., a corporation Original application April 19, 1941, Serial No. 389,396. Divided and this application November 11, 1944, Serial No. 563,037

4 Claims. (Cl. 74—216.5)

1

The present invention relates to balers and an object thereof is to generally improve the construction and operation of machines of this class.

A further object is to provide such a machine of larger capacity, lighter weight and lower cost than similar machines of comparable dimensions heretofore known.

A further object is to provide a novel combined engine and power take-off drive for balers.

Further objects will be apparent from the following description and accompanying drawings in which Figure 1 is a plan view of an illustrative machine embodying the invention.

Fig. 2 is an enlarged plan view of a portion of Fig. 1 with parts broken away and others omitted.

Fig. 3 is a view similar to Fig. 2 showing a modified driving mechanism.

Fig. 4 is a left side elevation of the machine indicated in Fig. 1.

Similar reference characters have been applied to the same parts throughout these drawings and specification.

The machine of the present invention is generally similar to that shown and described in pending application, Serial No. 389,396, filed April 19, 1941, now Patent No. 2,362,861, of which this application is a division.

As seen in Fig. 1, the illustrative machine includes a baler generally designated as B, a pickup generally designated as P, feeding means F and bale dividing means D, the mechanism being driven, if desired, by an engine E. Pickup P operates to elevate material from the ground on to an apron 10 which conveys the material toward baler B and beneath a rotating drum, roller or feeder 11. Apron 10 and feeder 11 urge the material into the baling chamber in the present instance through an opening in the side thereof, dividing means D operating periodically to provide a pathway for a wire or other binding means and without interruption of the feeding by apron 10 and drum 11 in the manner fully disclosed in the above identified patent. However, it is to be understood that the principles herein set forth are not necessarily limited to the exact type of baler disclosed in said patent and accordingly it is to be understood that the invention is not to be taken as limited to this specific type of baler but only insofar as defined in the appended claims.

Returning to a more detailed description of the machine as seen in Figs. 1 and 4, the main body of the baler comprises a baling chamber

2 made up in any suitable or well-known manner as for example a top plate 12 connected as by angle irons 13 and 14 with side plates 15 and 16, plates 15 and 16 being connected as by angle irons 17 and 18 with a bottom plate 19. These members make up a box-like structure constituting the baling chamber or compression chamber of the baler. Angle irons 17 and 18 are suitably supported from an axle 20 and ground wheels such as 21 and are connected in any suitable manner with a platform or extension 22 on which is supported above mentioned engine E. Platform 22 in the present instance is supported on a front truck in the form of a fork or similar member indicated at 23. Angle irons 17 and 18 together with platform 22 therefore form a chassis or foundation framework for the baler and specifically for the parts involved in the present invention.

Angle irons 17 and 18 are united in the present instance by a frame, bulk head or the like 24 at the front of the baling chamber to stabilize and stiffen the structure.

The baling mechanism is associated with baling chamber or body portion B, as above stated, platform 22 carrying engine E, above noted, the engine having a crank or driving shaft 25 and a driving pulley 26. The details of engines being generally well-known and forming no part of the present invention, the engine need not be further described.

Pulley 26 drives, through a belt or other flexible motion transmitting means 27, a flywheel generally described as 28 fixed on a main transverse driven shaft 29 through which it drives the baling mechanism in a manner fully disclosed in the above identified patent. Belt 27, as well as engaging pulley 26, and fly wheel 28 also engages a combined driving and driven wheel or idler pulley 30 fixed on a transverse combined driving and driven shaft or countershaft 31 (see also Fig. 2), the belt being maintained in contact with idler 30 by a belt tightening idler 32 suitably supported as by an arm 33 fixed on a shaft 34. Shaft 34 is supported in bearings 35 and 36 fixed with a reinforcing or foundation plate 37 and has a lever 38 urged rearwardly in the present instance by a spring 39 for rotating shaft 34 in a clockwise direction as seen in Fig. 4 for yieldably raising idler 32 into contact with belt 27. When it is desired to temporarily disconnect the mechanism from engine E, lever 38 may be pulled toward engine E which will lower idler 32 and loosen belt 27. A hook or other suitable fastening means 40 may be provided for holding lever 38 in this position.

Shaft 29 constitutes the main input shaft of a novel reduction gear generally designated as 41 for driving a crank shaft 42 at the required relatively slow speed as fully disclosed in the above identified patent.

Drum 11 is carried by arms 43 pivotally supported on a shaft 44, carried in the feeder mechanism F, so that the drum may rise and fall or "float" on incoming material. Pivot shaft 44 has a journal or pilot portion 45 on which is journaled a hub portion 46 fixed on an auxiliary longitudinal driven shaft 47. Hub portion 46 carries a sprocket 48 driving through a chain 49, a sprocket 50 fixed on a shaft 51 constituting an axle for drum 11. Thus sprocket 48 may drive drum 11 while chain 49 will not be affected by raising and lowering of drum 11. Hub portion 46 also has a sprocket 52 driving a chain 53 constituting a driven for apron 10 in a manner fully set forth in the above identified patent.

Above mentioned shaft 47 extends lengthwise of bale chamber B toward bearing 54 and carries a sprocket or the like 55, a safety release clutch 56 of well-known or suitable type being interposed in the present instance. A chain 57 engages sprocket 55 and also a sprocket 58 mounted on a longitudinally disposed combined driving and driven shaft 59 journaled in a beveled gear set housing 60, as more particularly shown in Fig. 2, shaft 59 carrying a bevel gear 61 meshing with a bevel gear 62 on above mentioned transverse shaft 31, shaft 31 as above indicated carrying combined driving wheel and driven idler 30 which is driven by belt 27. Accordingly, actuation of belt 27 by engine E causes driving of shaft 47, drum 11 and apron 10.

Modification of this drive is contemplated within the scope of the invention, and as a matter of fact, an important phase of the invention is to provide dual uses for the same mechanism. For example, if a powerful tractor is available, it is possible to dispense with engine E in a baler sold to operate with such tractor. Thus as suggested in Fig. 3, shaft 59 may carry a universal joint generally designated as 63, connecting it with a power take-off shaft 64 of suitable or well-known type operated from the tractor (not shown) in well-known manner. Shaft 59 thereby in this instance becomes the main drive shaft or input shaft of the machine. Rotation of shaft 59 drives the feeding mechanism through above mentioned chain 57 and a shorter belt 65 is applied about pulley 30 and flywheel 28. Shaft 31 thus becomes a driving instead of a driven shaft and actuates the main plunger drive of the baler in a manner analogous to the above described actuation from engine shaft 25. Therefore, from a manufacturing standpoint, there is exceedingly little difference between an engine driven machine and a power take-off driven machine, and owing to the dual function of shafts 31 and 59 large economies in manufacture, storage and distribution may be effected.

The above being a complete description of an illustrative embodiment of the invention, what is claimed as new and desired to be secured by Letters Patent of the United States is:

1. In a baler having a longitudinal body portion, a main driven shaft transverse to the body portion and an auxiliary driven shaft arranged longitudinally of said body portion, a driven wheel on said main driven shaft, a driving means for said shafts on the longitudinal body portion, said driving means including a combined driving and driven countershaft disposed transversely of the body portion and a combined driving and driven longitudinal shaft connected for rotation with the countershaft, a combined driving and driven wheel on said countershaft, flexible driving means connecting said wheels, driving means connecting said auxiliary shaft and said combined driving and driven longitudinal shaft, an engine on the longitudinal body portion having a wheel engaged with the first mentioned flexible driving means, and said combined driving and driven longitudinal shaft being adapted to receive a power taken-off drive.

2. In a baler having a longitudinal body portion, a main driven shaft transverse to the body portion and an auxiliary driven shaft arranged longitudinally of said body portion, a driven wheel on said main driven shaft, a driving means for said shafts on the longitudinal body portion, said driving means including a combined driving and driven countershaft disposed transversely of the body portion and a combined driving and driven longitudinal shaft connected for rotation with the countershaft, a combined driving and driven wheel on said countershaft, flexible driving means connecting said wheels, driving means connecting said auxiliary shaft and said combined driving and driven longitudinal shaft, and an engine on the longitudinal body portion having a wheel engaged with the first mentioned flexible driving means.

3. In a baler having a longitudinal body portion, a main driven shaft transverse to the body portion and an auxiliary driven shaft arranged longitudinally of said body portion, a driven wheel on said main driven shaft, a driving means for said shafts on the longitudinal body portion, said driving means including a combined driving and driven countershaft disposed transversely of the body portion and a combined driving and driven longitudinal shaft connected for rotation with the countershaft, a combined driving and driven wheel on said countershaft, flexible driving means connecting said wheels, and driving means connecting said auxiliary shaft and said combined driving and driven longitudinal shaft.

4. In a baler having a longitudinal body portion, a main transverse driven shaft and an auxiliary longitudinal driven shaft, a drive for said shafts comprising a bevel gear set on said body portion, a longitudinally disposed driving and driven shaft associated with said gear set, a connection from said longitudinally disposed driving and driven shaft to said auxiliary longitudinal driven shaft, a transversely disposed driving and driven shaft associated with said gear set and connected through said gear set with said longitudinally disposed driving and driven shaft, a combined driving and driven wheel on said transversely disposed driving and driven shaft, a driven wheel on said main transverse driven shaft, a flexible driving element disposed about said wheels, and said longitudinally disposed driving and driven shaft being adapted to receive a power take-off shaft.

STANLEY D. RUSSELL.

REFERENCES CITED

The following references are of record in the file of this patent:

UNITED STATES PATENTS

| Number | Name | Date |
| --- | --- | --- |
| 2,293,679 | Barker | Aug. 18, 1942 |